July 15, 1941.  A. P. FERGUESON  2,249,421
FENDER SHIELD AND ADAPTER
Filed Dec. 24, 1938
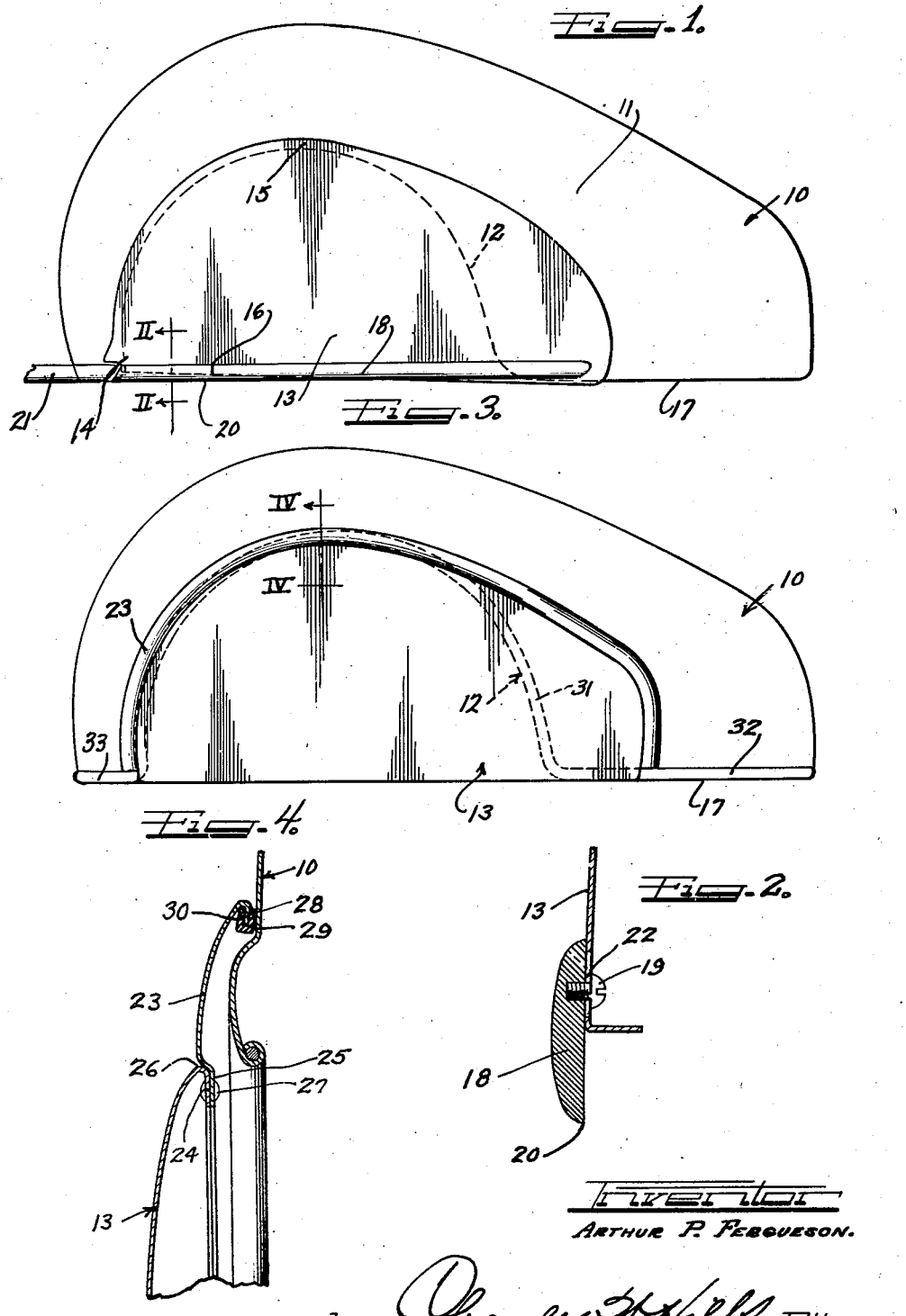
Inventor
ARTHUR P. FERGUESON.
by Charles H. Hill Attys.

Patented July 15, 1941

2,249,421

UNITED STATES PATENT OFFICE 2,249,421

FENDER SHIELD AND ADAPTER

Arthur P. Fergueson, Detroit, Mich., assignor to Houdaille-Hershey Corporation, Detroit, Mich., a corporation of Michigan Application December 24, 1938, Serial No. 247,582

1 Claim. (Cl. 280—153)

This invention relates to fender shields, and more particularly to a novel fender shield and adapter which will permit a normal size fender shield to be employed on a vehicle fender having an unusually large wheel access opening therein.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender shields have been employed to substantially cover this opening. As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel.

In order to minimize manufacturing costs as much as possible and in order to keep the ultimate cost of the fender shields to the consumer as low as possible, every effort has been made in the design of fender shields to provide a standard type of shield which might be employed on a wide variety of different types of automobiles by simply changing the fittings and supporting brackets which are employed to detachably secure the fender shield to the fender. This enables all fender shields to be stamped in a single die press or group of die presses and eliminates the need of providing separate dies which will provide fender shields of different sizes and shapes. While many different automobiles as manufactured at the present time employ substantially the same size wheel access opening in their outer depending side wall, a few types of automobiles employ a somewhat larger opening which prevents the standard size fender shield from being mounted thereon.

Accordingly, it is an object of the present invention to provide a novel fender shield and adapter therefor which will accommodate a standard size fender shield to a vehicle fender having an unusually large wheel access opening therein.

It is a further object of this invention to provide novel means for increasing the size of a fender shield.

It is a still further object of this invention to provide a novel fender shield having an adapter thereon.

Another and further object of this invention is to provide a fender shield having an adjustable molding along one edge thereof.

Another and still further object of this invention is to provide a novel fender shield having an auxiliary molding extending around the curved edge thereof and providing a fender engaging portion therefor.

The novel features which I believe to be characteristic of my invention are set forth with particularity in the appended claim. My invention itself, however, both as to its organization and manner of construction, together with further objects and advantages thereof, may best be understood by reference to the following description taken in connection with the accompanying drawing, in which:

Figure 1 is a front elevational view of a vehicle fender and fender shield assembly, the fender shield being equipped with an adapter;

Figure 2 is a fragmentary cross-sectional view taken along the line II—II of Figure 1;

Figure 3 is a front elevational view of a different embodiment of the present invention; and, Figure 4 is an enlarged fragmentary sectional view taken along the line IV—IV of Figure 3.

Referring first to the embodiment of the invention illustrated in Figures 1 and 2 of the drawing, there is shown a fender 10 of the high crown type having a downwardly depending outer side wall 11 in which the usual wheel access opening 12 is provided. As shown in the drawing, the wheel access opening 12 is substantially semi-circular. Detachably secured to the fender 10 and disposed over the opening 12 is a fender shield 13. Insofar as the present invention is concerned, the fender shield 13 may assume a wide variety of shapes and configurations without departing from the spirit and scope of the present invention. Furthermore, it will be understood that the fender shield 13 is detachably mounted on the fender 11 in any suitable manner (not shown).

One of the principal features of the present invention is the provision of an adapter on a fender shield which will enable the fender shield to be disposed on a fender having an opening which is slightly too large, particularly in its vertical dimension for the standard size fender shield.

It will readily be apparent from an inspection of Figure 1 of the drawing that if one of the corners, such for example as the lower left hand corner 14, is raised, the top 15 of the fender shield 13 is correspondingly raised. This raising of one corner of the fender shield, however, also causes the base edge 16 of the fender shield 13 to be raised which prevents it from forming a continuous line with the base edge 17 of the fender 10. The result is that an unattractive assembly would be formed if the assembly were permitted to remain in this condition. Accordingly, an adapter 18 in the form of a molding strip is secured to the lower edge of the fender shield 13 as at 19 in such a manner that the lower edge 20 of the molding strip forms substantially a continuous line with the base edge 17 of the fender 10 and is in harmony therewith. The fact that the base edge 16 of the fender shield 13 is disposed at an angle with respect to the base edge 20 of the molding or adapter 18 does not detract in any way from the appearance of the assembly, since the base edge 16 of the fender shield 13 is substantially concealed behind the molding strip 18.

Where the fender 10 and the vehicle upon which the fender 10 are mounted is equipped with a molding strip 21, as is frequently the case in modern automobile design practice, the molding or adapter 18 may be conveniently designed to harmonize therewith and form substantially a continuation thereof (see Figure 1).

The manner in which the molding or adapter 18 is secured to the lower edge of the fender shield 13 is preferably of such a character as to provide an adjustable fit. This may be conveniently provided by providing a slot 22 in the fender shield 13 which will permit a limited degree of vertical movement of the adapter or molding 18.

In Figures 3 and 4 of the drawing, I have illustrated a different embodiment of the present invention wherein the fender shield 13 is provided with a molding strip or adapter 23 which extends around the curved edge. As may be seen best in Figure 4 of the drawing, the curved edge of the fender shield 13 is inturned to form a flange 24. The adapter or molding 23 is provided with a flange portion 25 which is shaped and arranged to overlap the flange 24 of the fender shield 13 and be seated on the outer edge 26 of the fender shield 13. The adapter or molding 23 is rivited or otherwise suitably secured to the fender shield 13 as at 27.

The outer edge of the adapter or molding 23 is inturned as at 28 and a cushioning bead 29 having a channel shaped groove 30 therein is arranged to extend over the inturned edge 28 of the adapter or molding 23 and be secured thereto. The cushioning strip 29 is formed of any suitable cushioning material such as rubber and is arranged to engage the outer front face of the fender 10. As is shown in Figures 3 and 4 of the drawing, the fender 10 is illustrated as being of a type having a molding 31 extending around the opening defining edge 12, the molding 31 also extending along the base edges 17 of the fender 10 as at 32 and 33.

While I have shown particular embodiments of my invention, it will, of course, be understood that I do not wish to be limited thereto, since many modifications may be made, and I, therefore, contemplate by the appended claim to cover all such modifications as fall within the true spirit and scope of my invention.

I claim as my invention:

As an article of manufacture, a fender shield for disposition over the wheel access opening of a vehicle fender, said fender shield having a curved edge defined by a folded-back marginal portion, a rigid fender adapter strip extending around said curved edge of said fender shield and seated and secured thereon, and a cushioning bead mounted on the opposite edge of said adapter strip for engaging said fender when said fender shield is in mounted position thereon.

ARTHUR P. FERGUESON.